US007228609B2

(12) United States Patent
Smith

(10) Patent No.: US 7,228,609 B2
(45) **Date of Patent: *Jun. 12, 2007**

(54) EXTRACTOR

(76) Inventor: John A. Smith, 7 South Road, Templefield Harlow, Essex CM20 CM20 2AP (GB)

( * ) Notice: Subject to any disclaimer, the term of this patent is extended or adjusted under 35 U.S.C. 154(b) by 235 days.

This patent is subject to a terminal disclaimer.

(21) Appl. No.: 10/844,970

(22) Filed: May 13, 2004

(65) Prior Publication Data

US 2005/0005413 A1 Jan. 13, 2005

Related U.S. Application Data

(63) Continuation-in-part of application No. 10/042,121, filed on Oct. 24, 2001, now Pat. No. 6,745,447.

(30) Foreign Application Priority Data

Oct. 24, 2000 (GB) ................................ 0026027.3
May 13, 2003 (GB) ................................ 0310973.3

(51) Int. Cl.
*B23P 19/00* (2006.01)
*B23P 19/04* (2006.01)

(52) U.S. Cl. ........................................ 29/426.5; 29/259

(58) Field of Classification Search ............... 29/426.5, 29/259, 260, 261, 898.08
See application file for complete search history.

(56) References Cited

U.S. PATENT DOCUMENTS 1,024,147 A 4/1912 Ripley ....................... 29/281.1
2,013,923 A * 9/1935 Naccarato .................... 81/441
2,170,461 A 8/1939 Pepperdine .................... 29/85
3,071,848 A * 1/1963 Lawry et al. ................. 29/267
3,846,898 A 11/1974 Kerr ............................ 29/259
3,990,139 A 11/1976 Touchet ........................ 29/261
4,007,535 A * 2/1977 Brandt et al. ................. 29/261
4,195,398 A 4/1980 Matthews .................... 29/262
4,214,362 A 7/1980 Beard .......................... 29/726
4,274,189 A * 6/1981 Conover ...................... 29/256
4,369,569 A 1/1983 Armstrong, Jr. et al. ...... 29/726
4,649,615 A * 3/1987 Hundley ....................... 29/261
4,694,569 A * 9/1987 Colvell et al. ................ 29/724
4,724,608 A 2/1988 Parrott et al. ................. 29/724
4,761,869 A * 8/1988 Barry et al. .................. 29/261
4,852,235 A 8/1989 Trease et al. ................. 29/263
4,977,661 A 12/1990 Wood .......................... 29/261

(Continued)

FOREIGN PATENT DOCUMENTS

GB 1571958 7/1980

(Continued)

OTHER PUBLICATIONS

"Tapmatic '85, General Catalog", (1985),20-21.

*Primary Examiner*—Essama Omgba
(74) *Attorney, Agent, or Firm*—Schwegman, Lundberg, Woessner and Kluth P.A.

(57) ABSTRACT

To extract a bushing from a housing, a number of cylindrical engaging elements are inserted in the bore of the bushing. The elements are clipped together by clips and have a lip which bears on the bushing end surface. An extractor head pushes on the elements to force the bushing from the housing.

12 Claims, 7 Drawing Sheets

U.S. PATENT DOCUMENTS

| | | | | | |
|---|---|---|---|---|---|
| 5,058,256 | A | | 10/1991 | Taylor et al. | 29/260 |
| 5,165,156 | A | * | 11/1992 | Shultz | 29/275 |
| 5,174,005 | A | * | 12/1992 | Somerville | 29/261 |
| 5,249,342 | A | | 10/1993 | Smith | 29/252 |
| 5,251,368 | A | | 10/1993 | Somerville et al. | 29/255 |
| 5,255,435 | A | | 10/1993 | Shultz | 29/898.08 |
| 5,419,027 | A | * | 5/1995 | McPeak et al. | 29/252 |
| 5,557,833 | A | * | 9/1996 | Pool | 29/261 |
| 5,735,033 | A | | 4/1998 | Marugg | 29/254 |
| RE36,009 | E | * | 12/1998 | Shultz | 29/898.08 |
| 5,887,328 | A | * | 3/1999 | Rydin et al. | 29/259 |
| 5,896,639 | A | * | 4/1999 | Chen | 29/261 |
| 6,223,410 | B1 | | 5/2001 | Sroka | 29/261 |
| 6,609,283 | B1 | * | 8/2003 | Somerville | 29/262 |
| 6,665,918 | B1 | * | 12/2003 | Williams | 29/259 |
| 6,745,447 | B2 | * | 6/2004 | Smith | 29/426.5 |
| 6,895,646 | B1 | * | 5/2005 | Houg | 29/252 |
| 7,047,609 | B2 | * | 5/2006 | Hu et al. | 29/261 |
| 7,117,573 | B1 | * | 10/2006 | Hu | 29/261 |

FOREIGN PATENT DOCUMENTS

| | | | | |
|---|---|---|---|---|
| GB | 2098914 | A | * | 12/1982 |
| GB | 2370527 | | | 7/2002 |
| GB | 2401572 | A | * | 11/2004 |

* cited by examiner

EXTRACTOR

CROSS-REFERENCE TO RELATED APPLICATIONS

This application is a continuation-in-part application of U.S. patent application Ser. No. 10/042,121, filed Oct. 24, 2001, now U.S. Pat. No. 6,745,447, which claims priority under 35 U.S.C. 119 from United Kingdom Application Serial No. 0026027.3, filed Oct. 24, 2000 and United Kingdom Application Ser. No. 0310973.3 filed May 13, 2003, which applications are incorporated herein by reference

BACKGROUND OF THE INVENTION

The present invention relates to an extractor for bearings, bushings, sleeves, liners, and the like.

Many methods of extracting bearings, bushings, sleeves, liners and the like (hereinafter referred to generally as bushings) which are an interference fit in a housing often result in damage to the bushing and/or the housing.

Using a simple drift to drive out the bushing will score the housing and deform the end of the bushing. It also requires access to both ends of the housing.

Various pulling methods have been proposed.

U.S. Pat. Nos. 4,214,362 and 4,369,569 describe a tube puller in which an extractor cam forces gripping surfaces against the bushing inside wall, damaging the bushing and also risking distortion of the housing wall.

U.S. Pat. No. 5,249,342 describes an extractor which can be operated from one end of the housing. A cam is inserted through the bushing, followed by a collet. The collet has a number of legs and these are urged outwards by the cam to a predetermined diameter as the cam is withdrawn. Lips on the legs engage the distal end of the bushing so that the cam, collet and bushing are withdrawn together. Accurate sizing of the collet and cam ensure that there is no distortion of the bushing and no scoring of the housing surface, avoiding any need to repair or dress the housing and allowing re-use of the bushing when appropriate. However, the collets are expensive to manufacture, and the collet/cam assembly must be tailored to a particular bushing internal diameter.

GB-A-2370527, the contents of which are incorporated herein by reference, describes an extractor system in which an engaging device, for engaging the end of the bushing prior to extraction, comprises a plurality of separately formed engaging elements which are mechanically coupled together such as by clips or by a key on one element engaging a keyway on another element. This provides an elegant mechanism for producing engaging devices to match bushings of different diameter. However, the handling of small parts can be a drawback in some workshops.

BRIEF SUMMARY OF THE INVENTION

A first aspect of the present invention provides an engaging device for engaging an end of a bushing prior to extraction of the collet and bushing from a housing, the device comprising a plurality of engaging elements each having a laterally extending lip thereon, and means for releasably connecting the elements together.

Preferably, the connected elements form a chain which is flexible to allow the chain to be rolled up for insertion in a bushing, and unrolled to place the elements against the bushing inner surface. In use, the engaging elements are arranged inside the bushing, with the lips extending behind the bushing end surface. An extractor then applies a removal force to the engaging elements to force the elements and bushing from the housing.

By releasably connecting the engaging elements together, the number of elements can be varied to suit the diameter of the bushing being extracted. The elements may be clipped together, preferably by clips which each engage two adjacent elements, forming a chain or bandolier.

To remove a bushing, a chain of elements is formed into a spiral or otherwise collapsed and inserted into the bushing. The spiral is expanded out to a broken loop or circle to engage the lips of the engaging elements behind the distal end of the bushing. An extraction tool can then bear on the ends of the elements to pull the elements and bushing from the housing.

A second aspect of the present invention provides an engaging device for engaging an end of a bushing prior to extraction of the bushing from a housing, the device comprising a plurality of engaging elements each having a laterally extending lip thereon for engaging the end of the bushing, wherein the engaging elements are adhered together by a resilient material.

The resilient material itself may be bond directly to the elements, for example using an insert moulding process, ultrasonic welding or the like, or it may be adhered to the elements by an adhesive.

By providing a resilient material between the elements, the elements can be formed into a roll or circle for insertion in the bushing. By adhering the engaging elements together via the resilient material there is no need for any assembly process. The adhesion between elements does not need to withstand great force. It is enough to ensure that the chain of elements can be easily handled and rolled to insert in a bushing.

A plurality of elements is joined one to another by intervening resilient material to form a chain. To match the number of elements, i.e. the chain length, to the bushing size, the resilient material between two elements can be cut. The cut length could be kept for use on similar sized bushings. However, a particularly preferred aspect of the invention is that elements may be reconnected by adhering them together again.

The material between two elements may be cut, or a cut made at the interface of the resilient material and the element A join between elements , or chains of elements, may be made or reformed with adhesive.

The connected elements form a chain which is flexible to allow the chain to be rolled up for insertion in a bushing, and unrolled to form a broken loop or circle to engage the lips of the engaging elements behind the distal end of the bushing, the pins resting against the inner surface of the bushing.

In another embodiment, the cut length is formed into a ring, the ends being glued together. The resilient connections between the elements are then compressed to insert the ring into the bushing.

A third aspect of the present invention provides an engaging device for engaging an end of a bushing prior to extraction of the bushing from a housing, the device comprising a plurality of engaging elements, each engaging element comprising a pin having a laterally extending lip thereon for engaging the end of the bushing and a clip which releasably clips one engaging element to a second engaging element, wherein the clip and pin are adhered together by a resilient material.

Preferably the resilient material is a spacer of rubber or elastomeric material.

Preferably the device is in the form of a chain which is flexible to allow the chain to be rolled up for insertion in a bushing.

In use, the engaging elements are arranged inside the bushing, with the lips extending behind the bushing end surface. An extractor then applies a removal force to the engaging elements to force the elements and bushing from the housing.

A former can be passed into the ring of engaging elements to urge then against the bushing, ensuring that the lips sit snugly on the end of the bushing as the elements are extracted with the bushing.

When the extraction is made from one end only of the housing, the extraction tool may be fed through the bushing before the engaging elements are put in place, or it may be provided with a collapsible claw which can be opened out after it has been fed through the elements and the former.

Thus, the invention provides a system which can be adapted to fit a wide range of bushing diameters by changing the number of engaging elements and/or the spacing between the elements. Engaging elements of different size may also be provided, smaller sizes being more suited to extracting smaller diameter bushings.

The lip on an engaging element is sized to bear on the end of the bushing and carry the force of the extraction tool to the bushing. The lip is dimensioned to stop short of the housing surface to avoid any scarring of the surface. Preferably the lip is formed at an end of the engaging element, the body of the element extending within the bushing.

BRIEF DESCRIPTION OF THE DRAWINGS

The invention will be further described by way of example with reference to the accompanying drawings, in which.

DETAILED DESCRIPTION

Figure 1A:
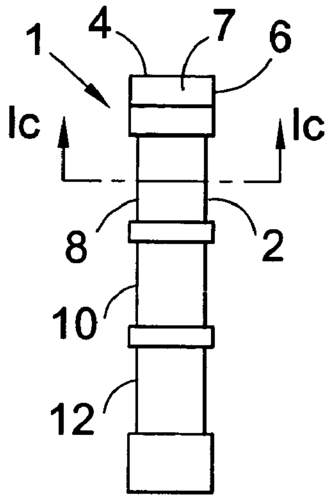
FIGS. 1*a* and 1*b* are plan and side views of an engaging element forming a first embodiment of the invention and FIG. 1*c* is a cross section along the line Ic—Ic of FIG. 1*a;*
Figure 1B:
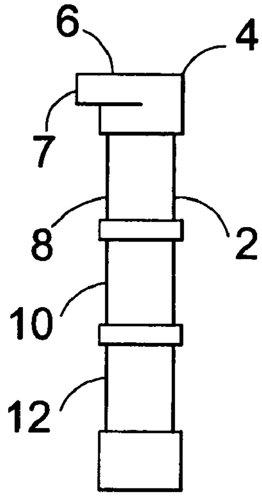
Figure 1C:
Figure 5:
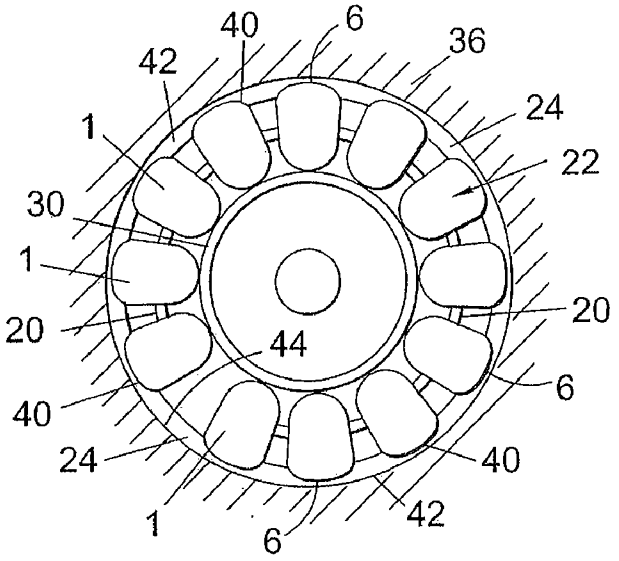
FIG. 5 is a view on line V—V of FIG. 4.

Referring to FIGS. 1*a* and 1*b*, an engaging element 1 is formed by a generally circular cross-section, cylindrical, solid pin 2 of toughened steel, such as EN56. At one end 4 of the pin 2 a lip 6 is integrally formed. The outer edge 7 of the lip 6 extends across the width of the pin and subtends an angle of about 60 degrees at the centre axis of the pin, as seen in FIG. 5. The lip 6 is concentric at its outer edge 7 with the pin body. The lip 6, has a depth X which is preferably about 85% of thickness of the wall of bushing to be extracted. Where the bushing has a smaller wall thickness, due to its design or through wear, a lip could be ground down to suit, pins with a smaller lip provided.

The pin 2 has three reduced diameter regions 8, 10, 12 for receiving clips 14 to clip engaging elements 1 together, as will be described with reference to FIGS. 2 and 3.

Figure 3:
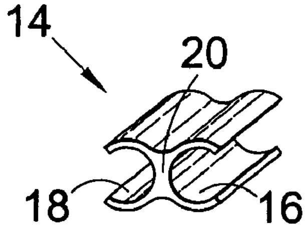
FIG. 3 is a perspective view of one form of clip, used to form the bandolier of FIG. 2*a;*

As seen in FIG. 3, a clip 14 has two generally C-shaped channels 16,18 joined back to back by a web 20. Clip 14 is of resilient plastics material or of spring steel. The steel may be covered in plastic to reduce the risk of scratching the base of the bushing. The walls of the C-shaped channels 16,18 subtend an angle greater than 180 degrees, preferably they are about 270 degrees, and are dimensioned to clip over the reduced diameter regions 8, 10, 12 of the engaging elements 1.

Figure 2A:
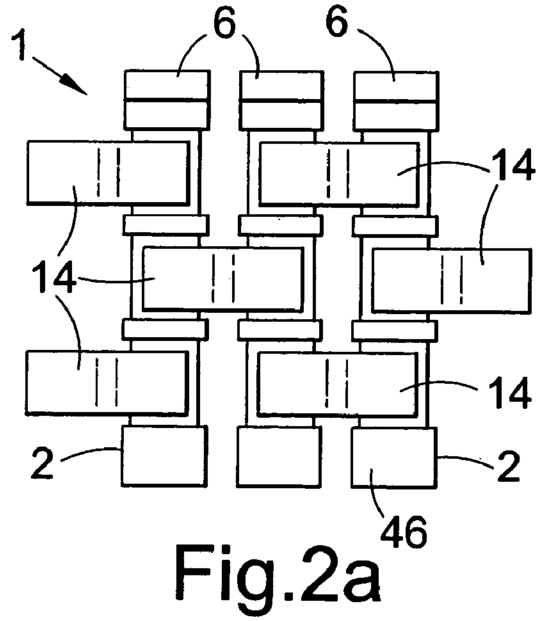
FIG. 2*a* illustrates the elements of FIGS. 1*a*, 1*b* and 1*c* formed into a bandolier.

As seen in FIG. 2, several engaging elements are clipped together, side by side, by the clips 14; regions 8, 12 being used to connect one pair of pins, and regions 10 being used to connect the next adjacent pins, and so on.

The clips are dimensioned to hold the elements 1 reasonably tightly so that the bandolier formed by a plurality of elements will not readily flex, but will tend to hold its shape. The pin diameter at the regions 8, 10, 22 may be about four thousandths of an inch oversized relative to the channels 16,18 to provide an interference between the parts.

Figure 2B:
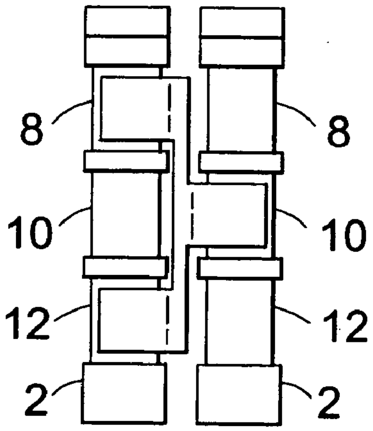
FIG. 2*b* illustrates a modification of a clip of FIG. 2*a*.
Figure 4:
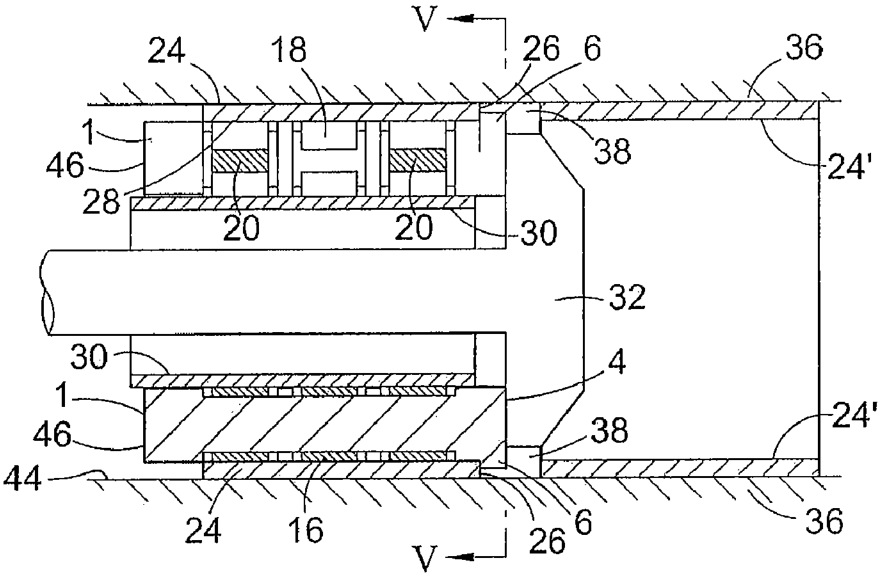
FIG. 4 is a cross-section through a bushing, showing the engaging elements in use.

FIG. 2*b* illustrates another form of the clip 14', in which the clip engages the centre portion 10 of one pin 2, and the outer portions 8, 12 of the adjacent pin. In the example of FIGS. 4 and 5, a bandolier 22 of some 12 engaging elements 1 has been formed. The bandolier 22 is rolled into a spiral and then inserted into a bushing 24 so that the lips 6 are positioned beyond the distal end surface 26 of the bushing. The bandolier 22 is then expanded out by hand to press the elements 2 against the bushing inner surface 28 so that the lips 6 will overlay the end surface 26. A tube 30 is then inserted to hold the bandolier 22 in place, with the elements snug against the inner surface 28.

An extractor head 32 is then brought to bear on the end surfaces 34 of the elements 2, and is pulled in the direction of arrow A by a hydraulic or mechanical extractor (not shown) to withdraw the elements 2 and bushing 24 from the housing 36.

Extractor head 32 may be inserted through the bushing 24 before the bandolier 22 and cylinder 30 are put in place. Alternatively it could be inserted from the opposite end of the housing 36 (if the housing has a through bore) or it might have retractable claws to allow it to be fed through the tube 30.

In the example shown, the housing 36 accommodates two bushings 24,24', and the lips 6 on the pins 2 fit within the gully 38 between the bushings 24,24'.

To facilitate insertion of the tube 30, the engaging elements 1 may taper slightly towards the proximal end of the bushing, and/or a taper may be provided on the tube 30.

If the clips hold the pins close together, the overhanging lips 6 on the pins will limit the relative rotation of the pins. The end surfaces 46 of the pins may be marked to indicate the pin orientation. Also, the pins and clips may be flattened to hold the pins in the preferred orientation and provide some spring force to urge the engaging elements outward against the bushing.

As clearly seen from FIG. 5, a larger diameter bushing may be accommodated by adding pins 2 to the bandolier 22, and likewise a small diameter bushing by removing pins 2.

It is preferred to maximise the number of pins in order to spread the extraction force around the end surface 26 of the bushing 24.

However, to accommodate different bushing sizes, the spacing between the engaging elements 1 could be increased by increasing the width of the web 20 in the clips 14, for example.

Also different diameter pins may be provided to accommodate different ranges of bushing diameter.

Typically the main body of the pin 2 is about 8 mm diameter, and the lip 6 is formed on a diameter of about 10 mm, i.e. a 2 mm overhang.

The lip 6 is preferably at an end of the pin 2, but it may also be provided part way along the length of the pin. Also, the lip 6 may be of uniform depth, extending around the pin.

The pin is preferably cast using a lost wax system to give good definition to the pin shape, particularly in the region of the lip 6.

It is important to maintain a good overlap between the lip 6 of the pin 2 and the end of the bushing 24, and hence to keep the body of the pin 2 snug against the inner surface 28 of the bushing 24.

The sleeve 30 is provided to hold the pins 1 against the surface 28 of the bushing 24. However, when a bushing has worn it is necessary to provide a larger diameter sleeve, for example by building up the outer diameter of the sleeve with tape. However, this technique might not be rigorously followed in a workshop. Another possibility is to use a cylindrical coil spring in place of the sleeve 30. The spring can be wound about its axis to reduce the diameter of the spring for insertion into the circle of pins 2, and then released to expand out and bear on the pins.

Figure 6:
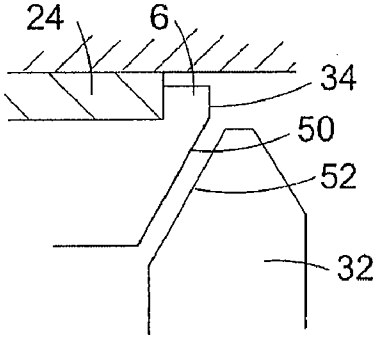
FIG. 6 is an enlarged detail of FIG. 4.

Also, the end faces 34 of the pins 2 may have a chamfer 50 and/or a chamfer 52 may be provided on the puller head 32 where the pin end 34 and puller head 32 engage, to urge the pins 2 outwardly, as shown schematically in enlarged view in FIG. 6. A chamfer angled at only a few degrees to the pin end surfaces 34 is expected to be sufficient.

It is also preferred to have a relatively long pin body extending within the bushing 24 to limit or resist any tendency of the pin to twist about its area of contact with the end of the bushing 24.

Figure 7A:
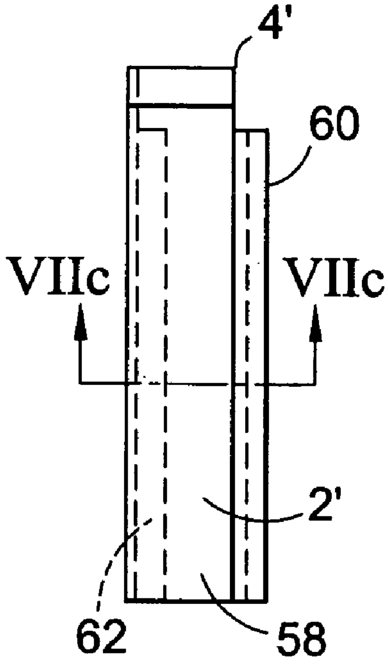
FIGS. 7*a* and 7*b* are plan and side views of another embodiment of an engaging element.
Figure 7B:
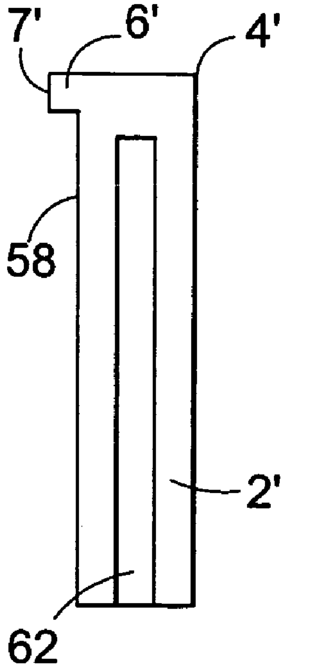
Figure 7C:
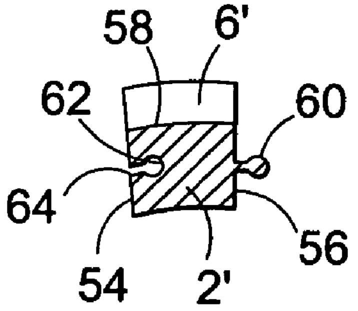
FIG. 7*c* is a cross-section along the line VIIc—VIIc of FIG. 7*a,*

FIGS. 7*a* to 7*c* show another embodiment of a pin of the invention. In this embodiment, means for releasably connecting pins together is integrally formed on each pin body. Referring to FIG. 7*c*, a pin 2' has a generally trapezium shaped cross-section formed on an annular segment, with a lip 6' extending from one end 4' of the pin 2'.

Generally radially extending sides 54, 56 converge inwardly, and a lip 6' is formed on the radially outer surface 58.

On one side 56 a key-hole shaped extension 60 is formed. This will slide in a corresponding key-hole shaped recess 62 provided in the other side 54 of an adjacent pin 2'.

The mouth 64 of the recess 62 is dimensioned to allow the projection 60 to swivel in the recess 62, thus allowing a line of pins to flex to accommodate different bushing sizes.

Figure 8A:
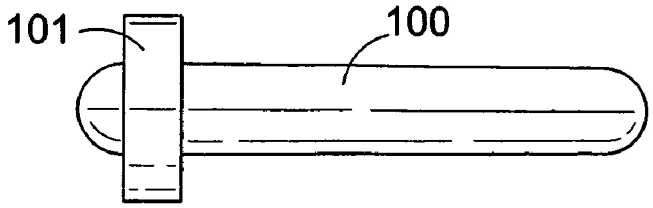
FIG. 8*a* shows a side view of another form of engaging element and FIG. 8*b* is a perspective view of another form of clip.
Figure 8B:
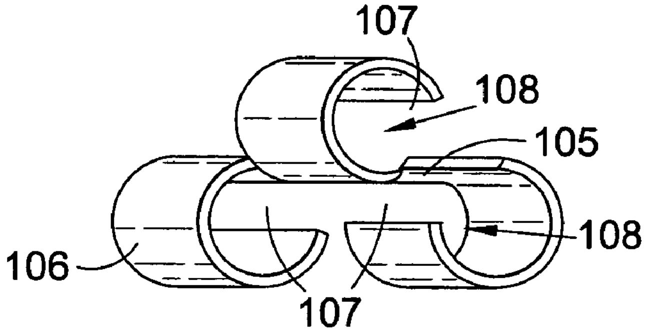
Figure 8C:
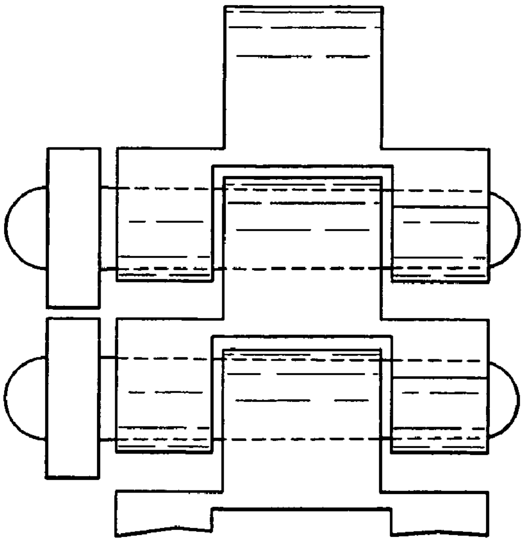
FIG. 8*c* shows a bandolier formed by the engaging elements of FIG. 8*a* and the clips of FIG. 8*b,*

Another embodiment of engaging element and clip are shown in FIGS. 8*a–c*. This works in the same way as the first type of engaging element and clip to extract a bushing. The engaging element is again a solid pin 100 with a generally circular cross section. A circumferential flange 101 is formed near the wide end of the pin. The engaging element may be made from toughened steel.

The clip design is similar to that shown in FIG. 3*b*. Each clip has a spine 105, attached to which are three generally C-shaped clip members 106. Each clip member 106 forms a channel 108 perpendicular to the C-shape. Each C-shaped clip member 106 is attached by its end to the spine 105, although alternatively, it could be attached by the back of the C-shape. The three clip members 106 project from the spine 105 in a row along its length. The two channels formed by the clip members at the two ends of the spine are aligned, and they are parallel to the channel formed by the middle clip member, but on an opposite side of the spine. The opening gaps 107 in the two end C-shape clip members 106 are preferably on opposite sides. The C-shaped clip members 106 subtend an angle greater than 180 degrees, preferably they are about 270 degrees, and are dimensioned to clip around the pin of the engaging elements. Preferably, the clips are spring clips, and may be made of resilient plastics material or spring steel. They may be toughened, and may be coated with a protective material. Preferably, they are made from plastics coated spring steel where the coating prevents scratching of the bore.

Several engaging elements of this second type may be clipped together, side by side, by the clips, as shown in FIG. 8*c*. The engaging elements may be slid axially or sideways into the channels of the clips. The flange 101 on the pin 100 is preferably circular in shape, and acts as a lip to engage the bushing. The clips are dimensioned to hold the elements reasonably tightly so that the bandolier formed by a plurality of elements will not readily flex, but will tend to hold its shape.

Rather than being circular in cross section, the engaging elements and the channels of the pins may have flat areas on their surfaces. When an engaging elements are slid into channels to form a bandolier, the flat areas will tend to orient engaging elements to give the bandolier a preferred shape.

Figure 9:
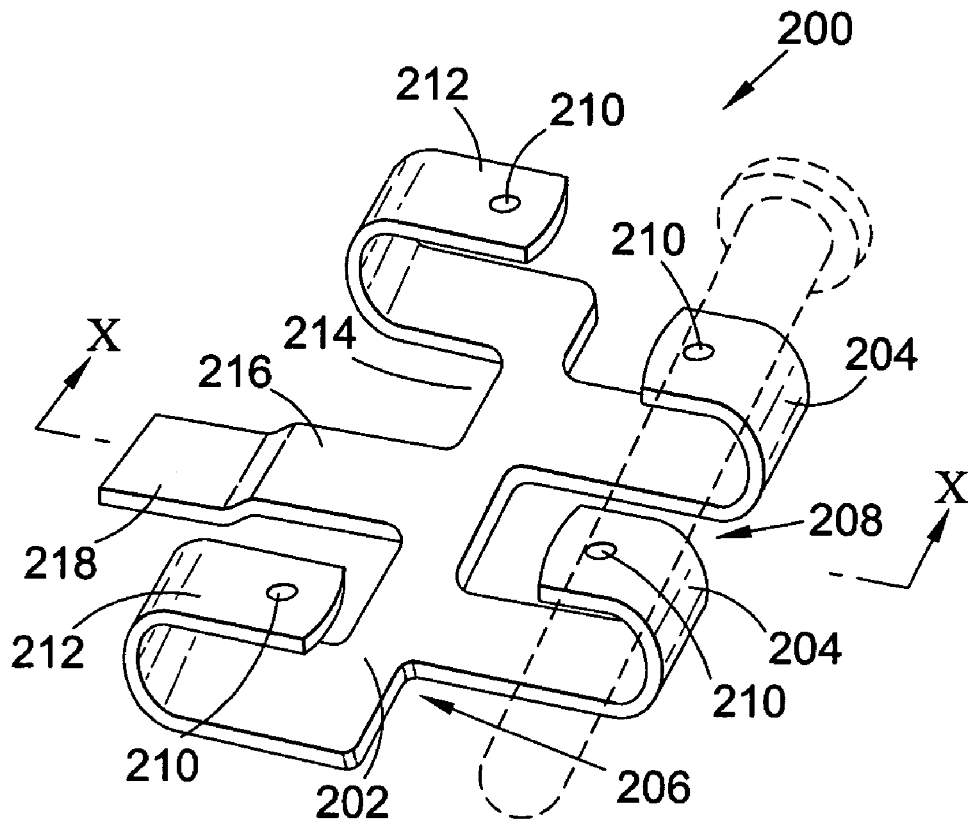
FIG. 9 is a perspective view of another embodiment of a spring clip.
Figure 10:
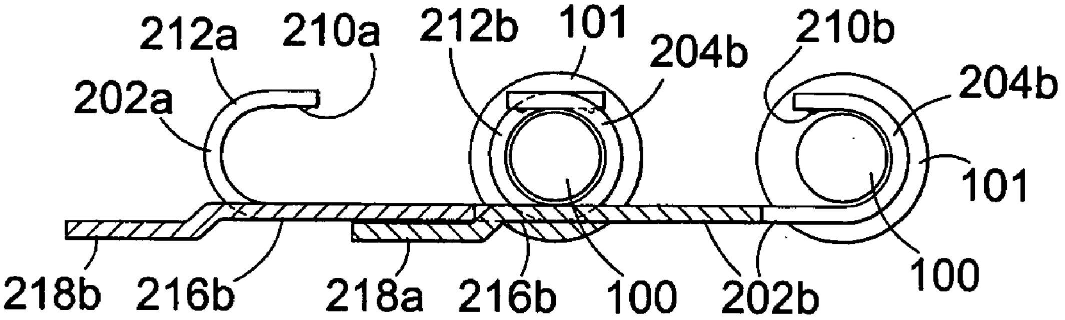
FIG. 10 is a cross-section along line X—X of FIG. 9, showing two clips and two engaging elements in position.

FIGS. 9 and 10 show another embodiment of a clip for securing the pins 100 together to form a chain or bandolier.

Referring to FIG. 9, a clip 200 is formed of spring steel and coated with plastics. A central web 202 has two U-shaped arms 204 extending to one edge 206, spaced apart by a gap 208. A pin 100, shown in dotted outline, clips into the arms 204, or may be slid in axially. Arms 204 grip the pin 100 and nibs 218 (see FIG. 10) also serve to hold the pin 100 in place.

Two further U-shaped arms 212 extend from the opposite edge 214 of web 202. Arms 212 are spaced apart to sit either side of the pair of arms 204 of an adjacent like clip. A central tongue 216 formed in the plane of web 202 is positioned centrally of arms 212 and will extend into the gap 208 of a like adjacent clip. Nibs 210 are also provided on arms 212.

The outer end 218 of tongue 216 is stepped below the plane of web 202, so that it will sit below the web 202 of a like adjacent clip (see FIG. 10).

In use, a pair of clips 200 can be brought together, the arms 204 of one clip sitting between arms 212 of the adjacent clip, and the end portion 218 of tongue 216 sitting beneath web 202. A pin 100 is then slid axially into the space defined between the oppositely facing aims 204, 212. Alternatively, a pin 100 can be clipped into one set of arms 204, or 212, and the arms of the other clip then clipped over the pin 100.

Referring to FIG. 10, two clips 202 are shown and distinguished by suffices a and b.

Referring to FIG. 10, the tongue 216, 218 will tend to resist bending of a row of clips 200 and pins 100. Nevertheless, tongue 218 is of spring steel, and so a bandolier can be bent against the force of the tongues 216, 218 to form a curl which can be inserted in a bush, tongues 216, 218 tending to straighten the curl and to urge the pins 100 outwards against the bush inner surface.

Figure 11A:
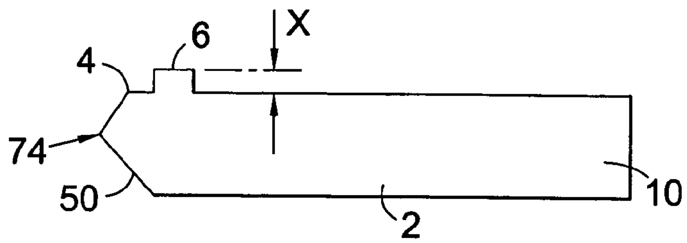
FIGS. 11*a* and 11*b* are side and edge views of an engaging element of a further embodiment of the invention.
Figure 11B:
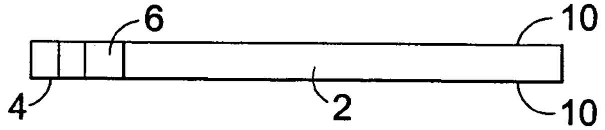

Referring to FIGS. 11*a* and *b*, an engaging element is formed by a generally rectangular cross-section, elongate, solid pin 2 of toughened steel, such as EN56. At one end 4 of the pin 2 a lip 6 is integrally formed and extends across the width of the pin. The lip 6, has a depth X which is preferably about 85% of thickness of the wall of bushing to be extracted. Where the bushing has a smaller wall thickness, due to its design or through wear, a lip could be ground down to suit, or pins with a smaller lip provided.

The pin 2 may be cut or stamped from sheet metal, or cast.

Figure 12:
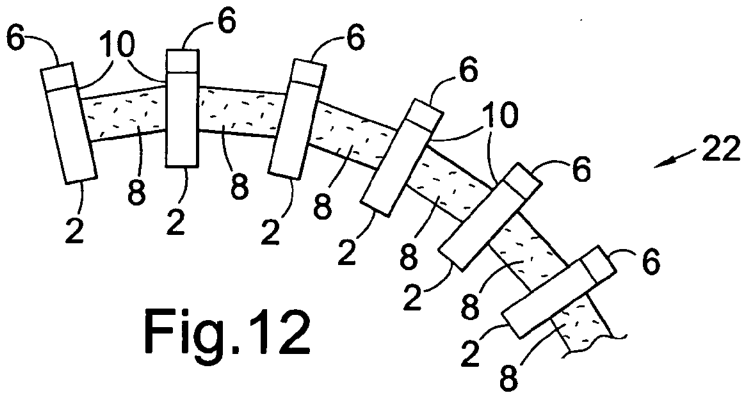
FIG. 12 is an end view of the elements of FIGS. 11*a* and 11*b* formed into a chain.
Figure 13:
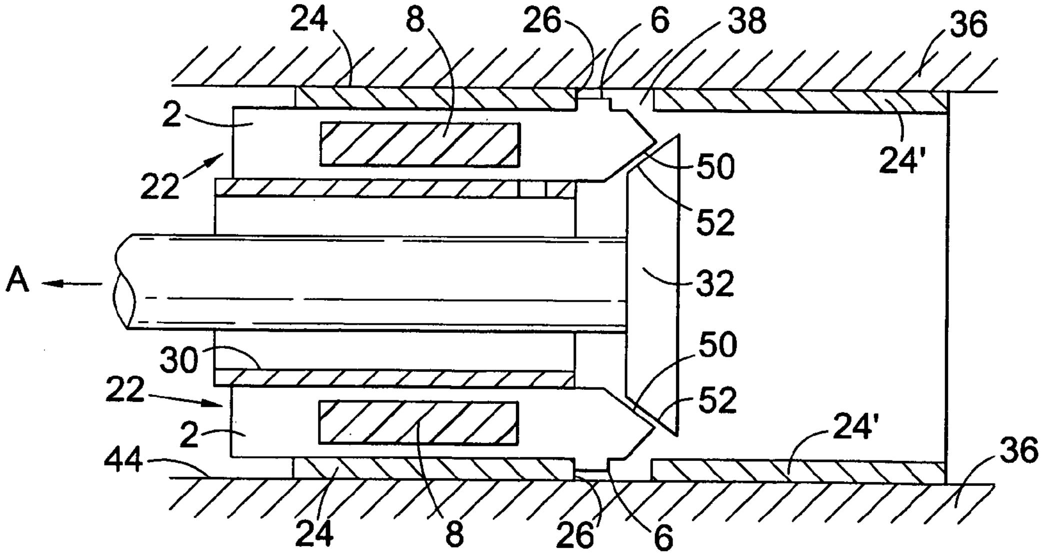
FIG. 13 is a cross-section through a bushing, showing the engaging elements in use.

As seen in FIG. 12, several pins 2 are adhered together, side by side, by resilient material in the form of elastomeric or rubber spacers 8, in this case neoprene cord, which are glued to the facing sides 10 of adjacent pins 2, forming a chain 22. Chain 22 is of indefinite length. A long length may be supplied, or several shorter lengths which can, if necessary, be glued end to end. Any suitable polymer material may be used. The material should bond well to the pins 2 and have sufficient flexibility to allow a chain of pins to be held in a curved shape by hand. The material may be bonded to the pins by adhesive, or may be moulded on to the pins. The spacers 8 are is preferably trapezium shaped in cross section so as to impart a slight curve to a chain of pins, the curvature being somewhat less than the curvature of the largest bushing which is likely to be extracted.

In use, a chain 22 of pins is cut to the required length by cutting through a spacer 8. The chain 22 is rolled into a spiral and then inserted into a bushing 24 so that the lips 6 are positioned beyond the distal end surface 26 of the bushing. The chain 22 is then expanded out by hand to press the elements 2 against the bushing inner surface 28 so that the lips 6 will overlay the end surface 26. The resilience of the spacers 8 may be sufficient to hold the pins in place against the inner surface of the bushing 26. A tube 30 may be inserted to hold the chain 22 in place, with the elements snug against the inner surface 28.

In another modification, a chain of pins is formed into a ring, with the end pins being glued together via a spacer 8. The ring outer diameter will preferably be approximately equal or slightly greater in diameter to the internal diameter of the bushing. The ring is then compressed (the spacers 8 being compressed) to insert it into the bushing. In principle, the ring could be of smaller diameter, and then the expanded outwards by a former placed inside the ring, stretching the spacers 8.

An extractor head 32 is then brought to bear on the end surfaces 34 of the elements 2, and is pulled in the direction of arrow A by a hydraulic or mechanical extractor (not shown) to withdraw the elements 2 and bushing 24 from the housing 36.

Extractor head 32 may be inserted through the bushing 24 before the chain 22 and cylinder 30 are put in place. Alternatively it could be inserted from the opposite end of the housing 36 (if the housing has a through bore) or it might have retractable claws to allow it to be fed through the tube 30.

In the example shown, the housing 36 accommodates two bushings 24,24', and the lips 6 on the pins 2 fit within the gully 38 between the bushings 24,24'.

To facilitate insertion of the tube 30, the pins 2 may taper slightly towards the proximal end of the bushing, and/or a taper may be provided on the tube 30.

The resilient material 8 between the pins serves to inhibit rotation of the pins, ensuring good contact to the lips 6 with the bushing end wall.

A larger diameter bushing may be accommodated by gluing an additional pin and spacer, or additional chain length to chain 22, and likewise a small diameter bushing by removing pins 2 by cutting spacer 8.

It is preferred to maximise the number of pins in order to spread the extraction force around the end surface 26 of the bushing 24.

However, to provide a chain for large diameter bushings, the spacing between the engaging elements 1 could be increased by increasing the width of the web of resilient material 8 between the elements, for example.

Also different thickness pins may be provided to accommodate different ranges of bushing diameter.

The lip 6 is preferably at an end of the pin 2, but it may also be provided part way along the length of the pin.

It is important to maintain a good overlap between the lip 6 of the pin 2 and the end of the bushing 24, and hence to keep the body of the pin 2 snug against the inner surface 28 of the bushing 24.

The sleeve 30 is provided to hold the pins 1 against the surface 28 of the bushing 24. However, when a bushing has worn it is necessary to provide a larger diameter sleeve, for example by building up the outer diameter of the sleeve with tape. However, this technique might not be rigorously followed in a workshop. Another possibility is to use a cylindrical coil spring in place of the sleeve 30. The spring can be wound about its axis to reduce the diameter of the spring for insertion into the circle of pins 2, and then released to expand out and bear on the pins.

The end faces 34 of the pins 2 have a chamfer 50 and a chamfer 52 is provided on the puller head 32 where the pin end 34 and puller head 32 engage, to urge the pins 2 outwardly as an extraction force is applied.

A range of puller heads of different diameter may be provided.

It is also preferred to have a relatively long pin body extending within the bushing 24 to limit or resist any tendency of the pin to twist about its area of contact with the end of the bushing 24.

Figure 14:
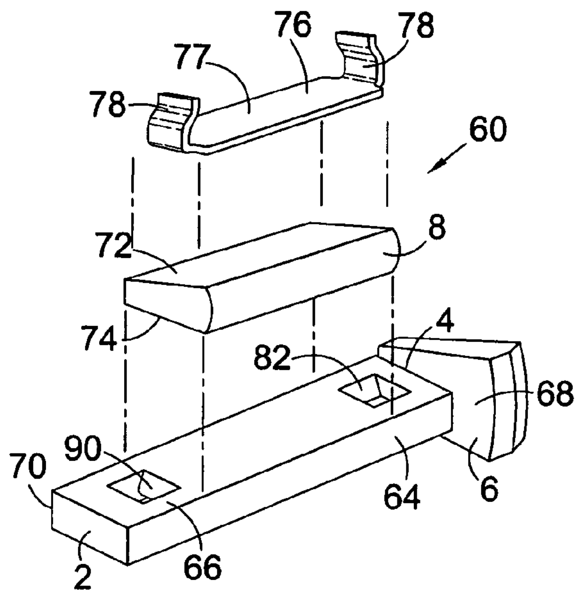
FIG. 14 is an exploded perspective view of an engaging element of a further embodiment of the invention.
Figure 15:
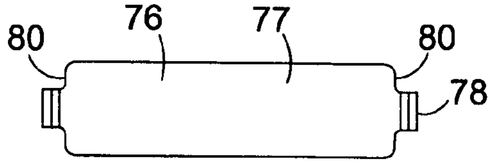
FIG. 15 is a top view of a clip which forms part of the engaging element of FIG. 14.
Figure 16:
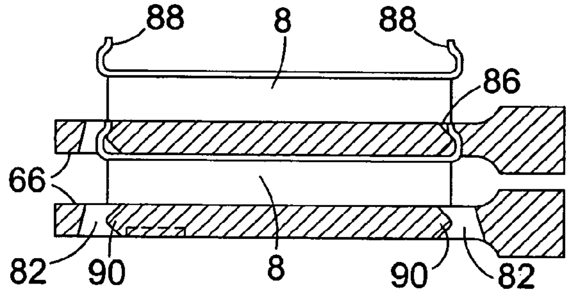
FIG. 16 is a side view of two connected engaging elements of FIG. 14.
Figure 17:
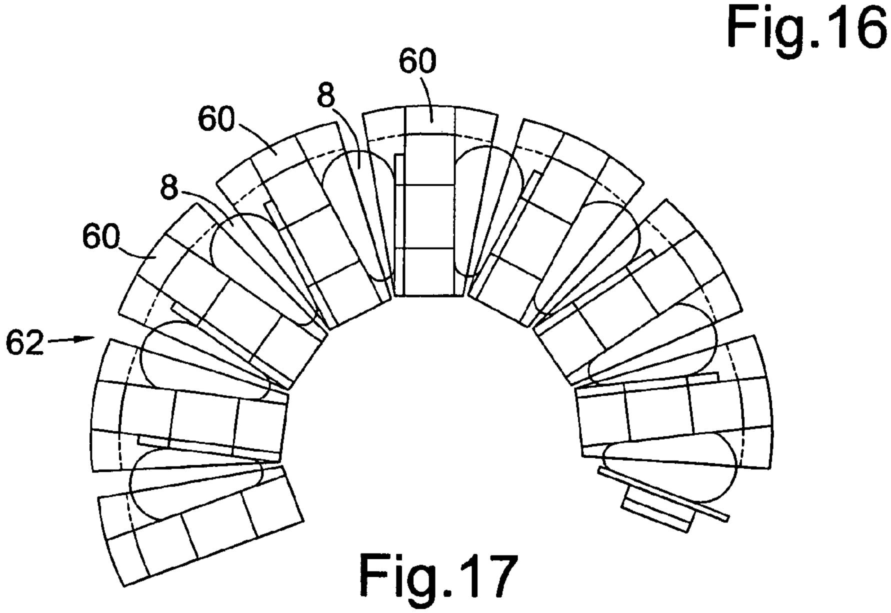
FIG. 17 is an end view of a chain of the engaging elements of FIG. 14.

FIGS. 14 to 17 show a second embodiment of the invention. FIG. 14 is an exploded perspective view of an engaging element 60 of this second embodiment. A number of engaging elements 60 can be attached to each other to form a chain 62, as shown in FIG. 17, or ring.

Each engaging element 60 is comprised of a pin 2 of toughened steel, such as EN56. The pin 2 has a generally rectangular cross-section. A radially extending lip 6 is integrally formed on one end 4 of the pin 2. The lip 6 extends from the outer side 64 of the pin 2 which, in use, is in contact with the inner surface 28 of the bushing 24, and from the two adjacent sides 66. Hence, in this embodiment, the portion 68 of the lip 6 which, in use, is in contact with the end surface

26 of the bushing 24 is wider than the lip 6 of the first embodiment, to provide an increased contact area between the pin 2 and the end surface 28 of the bushing 24. This increased contact area increases the force which can be applied to remove a bushing 24. The width of the lip 6 decreases towards the inner side 70 of the pin 2.

One side 72 of an elastomeric or rubber spacer 8, is attached to the centre portion 77 of a clip 76 and the other side 74 of the spacer 8 is attached to one of the adjacent sides 66 of the pin 2. In this case the spacer 8 is made of neoprene, but any suitable polymer material may be used. The material should bond well to the pin 2 and clip 76 and have sufficient flexibility to allow a chain of engaging elements 60 to be held in a curved shape by hand. The material may be bonded to the pin 2 and clip 76 by adhesive, or may be moulded on to the pin 2 or clip 76. The spacer 8 is preferably trapezium shaped in cross section so as to impart a slight curve to a chain of engaging elements 60, the curvature being somewhat less than the curvature of the largest bushing which is likely to be extracted.

The clip 76 is made of spring steel and has a two fingers 78 projecting from each end 80 of its centre portion 77. The two fingers 78 are inserted into corresponding apertures 82 in the pin 2 of a second engaging element 60. The fingers 78 are inclined towards each other and there is a ridge 90 on the surface 86 of the apertures 82, over which the end 88 of the fingers 78 passes to attach the clip 76 to the pin 2 of a second engaging element 60, thereby allowing a number of engaging elements 60 to be releasably locked together to form a chain 62, as shown in FIG. 17, or a ring. Fingers 78 of other shapes may be deployed, as long as the shape of the fingers 78 and corresponding apertures 82 is such that the clip 76 can be clipped to the pin 2 of a second engaging element 60.

In use, a chain 62 of engaging elements 60 is formed by connecting the appropriate number of engaging elements 60. The chain 62 is rolled into a spiral and then inserted into a bushing 24 so that the lips 6 are positioned beyond the distal end surface 26 of the bushing. The chain 62 is then expanded out by hand to press the engaging elements 60 against the bushing inner surface 28 so that the lips 6 will overlay the end surface 26. The resilience of the spacers 8 may be sufficient to hold the pins 2 in place against the inner surface of the bushing 26. A tube 30 may be inserted to hold the chain 62 in place, with the engaging elements 60 snug against the inner surface 28.

Other modifications may be apparent to those in the art and it is desired to include all such modifications as fall within the scope of the accompanying claims. All documents disclosed herein are incorporated by reference in their entirety for any purpose.

The invention claimed is:

1. An engaging device for engaging an end of a bushing prior to extraction of the bushing from a housing, the device comprising a plurality of engaging elements each having a laterally extending lip thereon for engaging the end of the bushing, wherein the engaging elements are arranged side by side, and adjacent engaging elements are attached one to the other by a spacer of resilient material disposed between the adjacent engaging elements the spacer being adhered to the respective engaging elements.

2. An engaging device as claimed in claim 1, wherein the resilient material of the spacer includes at least one of rubber and an elastomeric material.

3. An engaging device as claimed in claim 1 or 2 in the form of a chain which is flexible to allow the chain to be rolled up for insertion in a bushing.

4. An engaging device as claimed in claim 1 or 2 in the form of a ring.

5. A method of extracting a bushing from a housing, the method comprising providing a plurality of engaging elements each having a laterally extending lip thereon for engaging the end of the bushing, the engaging elements being arranged side by side, and adjacent engaging elements being attached one to the other by a spacer of resilient material disposed between the adjacent engaging elements the spacer being adhered to the respective engaging elements, each element having a lip for engagement with an end surface of the bushing, placing the elements in the bushing with the lips on the end surface of the bushing and applying pressure to ends of the elements, the lips transferring the pressure to the end surface of the bushing to force the bushing from the housing.

6. A method as claimed in claim 5, wherein a former is inserted into the bushing to hold the engaging elements in place.

7. An engaging device for engaging an end of a bushing prior to extraction of the bushing from a housing, the device comprising a plurality of engaging elements, each engaging element comprising a pin having a laterally extending lip thereon for engaging the end of the bushing and a clip which releasably clips one engaging element to a second engaging element, wherein the clip and pin are adhered together by a resilient material.

8. An engaging device as claimed in claim 7, wherein the resilient material is a spacer of rubber or elastomeric material.

9. An engaging device as claimed in claim 7 or 8 in the form of a chain which is flexible to allow the chain to be rolled up for insertion in a bushing.

10. An engaging device as claimed in claim 7 or 8 in the form of a ring.

11. A method of extracting a bushing from a housing, the method comprising providing a plurality of engaging elements, each engaging element being comprised of a pin having a laterally extending lip thereon for engaging the end of the bushing and a clip which releasabley clips one engaging element to a second engaging element, wherein the clip and pin are adhered together by a resilient material, placing the elements in the bushing with the lips on the end surface of the bushing and applying pressure to ends of the elements, the lips transferring the pressure to the end surface of the bushing to force the bushing from the housing.

12. A method as claimed in claim 11, wherein a former is inserted into the bushing to hold the engaging elements in place.

* * * * *

UNITED STATES PATENT AND TRADEMARK OFFICE

CERTIFICATE OF CORRECTION

PATENT NO. : 7,228,609 B2
APPLICATION NO. : 10/844970
DATED : June 12, 2007
INVENTOR(S) : John A. Smith It is certified that error appears in the above-identified patent and that said Letters Patent is hereby corrected as shown below:

In column 9, line 59, in Claim 1, after "elements" insert -- , --.

In column 10, line 16, in Claim 5, after "elements" insert -- , --.

In column 10, line 49 (Approx.), in Claim 11, delete "releasabley" and insert -- releasably --, therefor.

Signed and Sealed this

Twenty-seventh Day of July, 2010

David J. Kappos
*Director of the United States Patent and Trademark Office*